Feb. 15, 1966  J. P. WOODS ETAL  3,235,048
METHOD AND MEANS FOR STARTING A RECORDING DRUM
Filed April 16, 1963  2 Sheets-Sheet 1

ATTEST
Charles F. Steininger

INVENTORS.
John P. Woods
William M. Mullings
Edwin B. Neitzel

BY Norbert E. Birch
ATTORNEY

Feb. 15, 1966  J. P. WOODS ETAL  3,235,048
METHOD AND MEANS FOR STARTING A RECORDING DRUM
Filed April 16, 1963  2 Sheets-Sheet 2

Attest
Charles F. Steininger

INVENTOR.
John P. Woods
William M. Mullings
BY Edwin B. Neitzel
Attorney

United States Patent Office 3,235,048
Patented Feb. 15, 1966

3,235,048
METHOD AND MEANS FOR STARTING A RECORDING DRUM
John P. Woods, Dallas, William M. Mullings, Garland, and Edwin B. Neitzel, Dallas, Tex., assignors to The Atlantic Refining Company, Philadelphia, Pa., a corporation of Pennsylvania
Substituted for abandoned application Ser. No. 775,594, Nov. 21, 1958. This application Apr. 16, 1963, Ser. No. 275,181
10 Claims. (Cl. 192—84)

The present invention relates to a means for starting a recording drum. More specifically, the invention relates to a means for increasing clutch speed and reducing slippage so that the timing of events during recording can be reliably referred to a starting point and various recordings can be added without adjusting for starting time variations.

It is general practice in the recording art to initiate drum rotation well ahead of recording time. For example, in seismic field recorders it is conventional to initiate drum rotation prior to actuating the charge detonation switch. This insures the drum sufficient time to reach constant recording speed before significant data is recorded. Usually in this case each geophone group is provided with an individual recording head, and the group response is recorded on a single channel.

The above type recording system is not altogether suited for use with a weight dropping technique to create seismic waves or even in certain circumstances where conventional explosives are used. Because the magnitude of seismic waves created by weight dropping is much less than that of waves created by explosives, it is necessary to add a number of weight dropping recordings to create the desired amplitude. For example, consider a simplified case where each end of a weight drop traverse contains a group of 64 seismometers. The surface of the ground between the seismometer groups is divided up into a number of equal intervals. The weight truck starts dropping at the first interval; and each time the weight drops, the response of seismometer group 1 is recorded on one channel and the response of seismometer group 2 is recorded on another channel. Five drops are made along each interval, giving a total of ten recordings on ten channels. The truck then moves to the second interval and makes five drops along that interval. After the completion of these drops, an addition of the magnetic channels is made with the reflection events aligned. The ten recordings made by seismometer group 1 are added and rerecorded as a single channel. The ten recordings of seismometer group 2 are then added and rerecorded as a single channel. The weight truck then proceeds to the next interval and records five more drops. If a 50 percent ground overlap is desired, the original five recordings made by seismometer group 1 from the second interval are added to the five recordings made at the third interval and rerecorded as a second composite rerecording of group 1. The original recordings of group 2 over the second and third intervals are also added and rerecorded on a single channel. This procedure continues until the desired area is traversed. It is obvious from this example that the large number of additions and rerecordings presents a recording and synchronizing problem not found in conventional type recording techniques. For additional information concerning this method of comparing signals, see copending application, Serial No. 775,491, now Patent No. 3,078,947, owned by a common assignee. Since a number of recordings are to be added, the starting time of each record must be initiated from the same reference point or reference time. If this is not done, the variations from a standard or reference starting time (caused by variations in starting lag, clutch slippage, etc.) must be subtracted or compensated for in some way before the recordings can be added. Put in another way, the records to be added must be lined up from a zero time or the individual starting time variations must be subtracted from each record before the records can be added and rerecorded on a single channel.

From the above discussion it is clear that the desired method of operation is to start all the recordings from the same zero reference time instead of individually adjusting for starting time variations. It is also obvious that it is highly desirable to accomplish the above with the minimum change in conventional recording equipment. By eliminating variations in starting lag in conventional recording equipment, not only can the weight dropping technique be utilized, but conventionally made records can be combined as desired.

Since most conventional recording systems utilize a drum, the recording time for each channel can be varied to a certain extent depending on the circumference of the drum and speed of rotation. However, practical limitations in geophysical work dictate that the recording time for each channel be approximately five seconds. This time limit necessitates a new channel for each drop in order that the desired depth reflections may be recorded. In order to conserve the channel for recording information instead of wasting a portion by starting the drum before reflected signals are received, the recording drum rotation is initiated at or about the time the source of energy is actuated. This can be accomplished by a radio wave created by an impulse switch located on a weight or by a signal from a blaster. Drop initiation solves the recording space problem in a somewhat conventional manner; however, the problem of automatically accelerating the recording drum from a stationary position to recording speed with a minimum, uniform time delay has not been satisfactorily solved by any device or method known to applicants.

It is an object of this invention to provide a means to insure that recording drum rotation is initiated in such a manner that the drum start-to record speed time relay is always equal.

Another object is to provide a means to insure a minimum and uniform time delay in driving a recording drum to recording speed.

Another object of this invention is to provide a means to insure a quick-acting, nonslipping clutch engagement.

An additional object of this invention is to provide a means to insure that various channels recorded on a recording drum may be added without adjusting for starting time variations.

Another object of this invention is to provide a means for initiating recording drum rotation on command in such a manner that it attains recording speed in not more than 10 milliseconds effective record time (the time required to establish positive contact with ring 10).

Another object of this invention is to provide a means for monitoring the initiation of recording drum rotation to see that it attains recording speed in not more than 10 milliseconds effective record time.

Another object of this invention is to provide a means to accomplish the above-listed objects with a minimum of changes to a conventional geophysical recording system.

Another object of this invention is to provide a means to accomplish the above-listed objects which also can be used in conventional geophysical recording.

Briefly described, the invention consists of a means for automatically starting and accelerating a recording drum to "record" speed with a minimum and uniform time delay so that the timing of events on a number of recordings can be reliably referred to a common reference point. The novel system accomplishes this by reducing clutch slippage by continuously rotating a high mass clutch at recording speed, engaging the clutch with a low mass stationary body compliantly coupled to a recording drum, accelerating the drum to recording speed, and decreasing clutch-locking time by driving a light-weight engaging element or clutch face with a force of large magnitude. One form of apparatus capable of carrying out applicant's novel method includes a fast-acting magnetic clutch, a compliant coupling, and an accelerator or follow-up mechanism. The magnetic clutch engages a drive pulley to a recording drum through a compliant coupling. The compliant coupling connecting the magnetic clutch and the recording drum serves as an inertia-absorbing linkage to prevent clutch slippage. The accelerator or follow-up mechanism causes the recording drum to attain recording speed in a minimum time and in a uniform manner before the compliant coupling is expanded to its limit.

Figure 1:
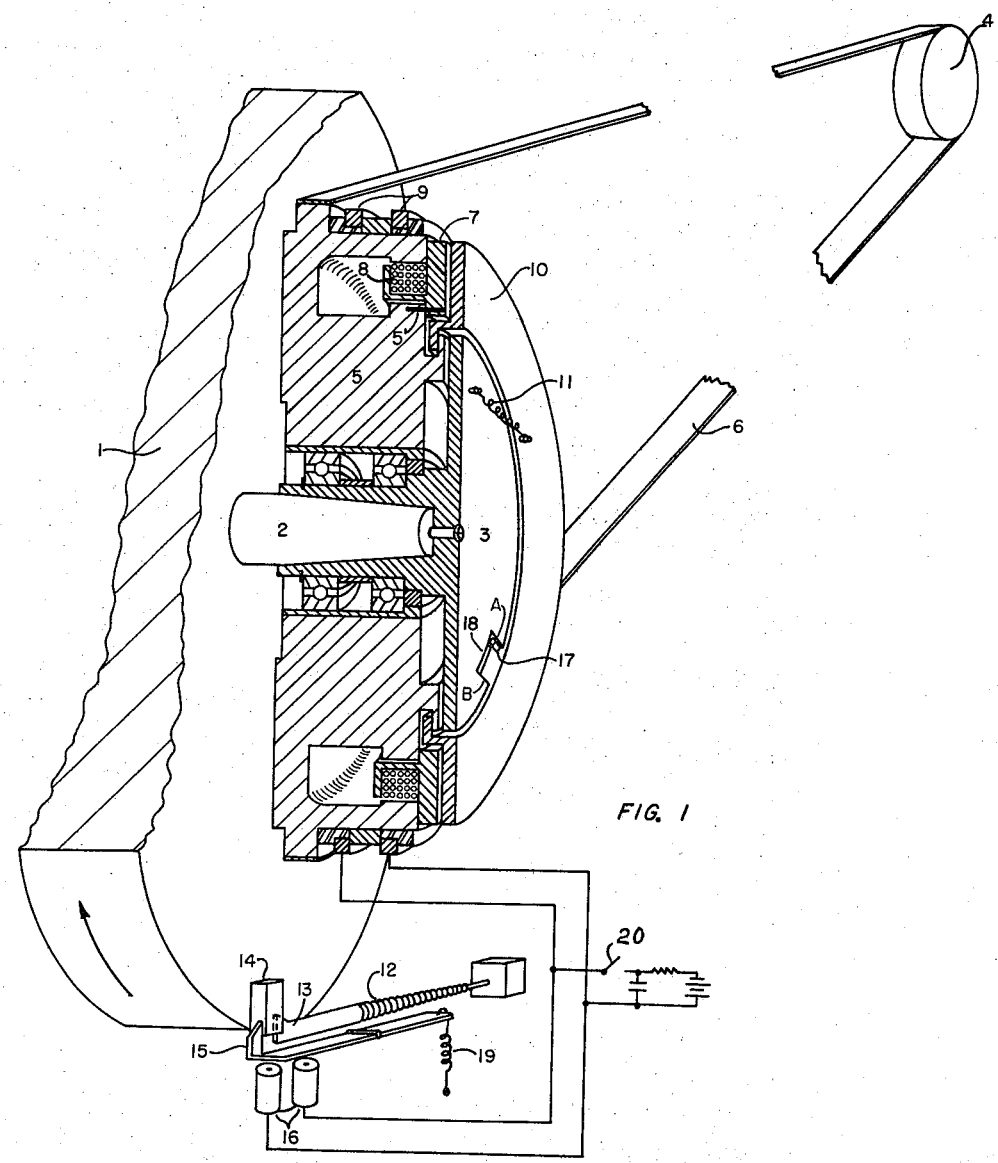
FIGURE 1 shows an isometric view, partially in cross section, of one form of the automatic high speed magnetic clutch-accelerator mechanism.

Referring to FIGURE 1, recording drum 1 is mounted on shaft 2. Plate 3, which for ease of assembly is initially separate from drum 1, is positioned on shaft 2 and secured so that drum 1, shaft 2 and plate 3 rotate as a single unit. Drive pulley 4 continually rotates housing 5 (permanent magnet) by means of a thin, steel belt 6 around its periphery. Pulley 4 can be mounted on the shaft of a synchronous motor or other type driving means. Armature 7 (aluminum or other nonmagentic, lightweight material) is caused to rotate with housing 5 by means of small pins 5', which allow axial movement of the armature with respect to the housing. The armature is provided with electrical windings 8, which are located within the air gap of the magnetic circuit of the housing, and a clutch face, which is parallel to and adjacent ring 10. Slip rings 9 allow the windings to be energized. Ring 10 ("Bakelite" or other low mass material) is coupled to plate 3 by compliant coupling spring 11 (unidirectional coupling by virtue of pin 17 seated against the far end A of notch 18). Pin 17 and notch 18 control the amount of movement between ring 10 and plate 3, as well as the expansion of spring 11. The drum kick or accelerator mechanism includes spring 12 mounted on the end of pawl 13, which engages catch 14 mounted on the side of drum 1. Latch 15 is held on catch 14 by the tension of spring 19. Solenoids 16 are positioned under latch arm 15 and are electrically connected to the same voltage source as windings 8.

In operation, a driving means, not shown, rotates pulley 4 and housing 5 at the desired recording speed. When a weight, not shown, is dropped, an impulse switch attached to the top of the weight closes at impact, causing a time-break to be propagated over a radio link to a recording truck. This type or similar impulse can be used to automatically close illustrative switch 20 and start the recording drum. The illustrative switch can be any suitable switching means operatable by the radio link or the particular communications used between the weight dropping truck and the recording truck. The closing of switch 20 causes a large current to be sent through slip rings 9, energizing windings 8 and causing the clutch face of armature 7 to slide to the right on pins 5' and to lock on to ring 10 in such a manner that ring 10 reaches recording speed within approximately 3 milliseconds. This is accomplished in the following manner. The large current through windings 8 sets up a magnetic field in opposition to the field set up by permanent magnet 5. (In order to increase the clutch reaction time, a high amplitude voltage pulse is added to the initial clutch excitation voltage.) This opposition quickly forces armature 7 axially against ring 10. Ring 10 is made of a low mass material, such as aluminum or "Bakelite," to reduce the inertial effect and to insure minimum slippage between rotating armature 7 and the ring. A rubber facing on armature 7 and fine abrasive dust embedded on the face of ring 10 may also be provided to reduce slippage if desired. As ring 10 begins to rotate, tension is applied to spring 11, which couples plate 3 and the recording drum 1 to ring 10. Spring 11, connecting ring 10 and plate 3, is of sufficient strength to overcome bearing friction and recording element friction in contact with the drum periphery. It should be noted that spring 11 must be sufficiently strong to urge pin 17 against the far end A of notch 18 after the kicking action has overcome drum inertia. If 17 is not maintained against end A, it will float between the ends A and B of notch 18, causing errors in the timing lines.

At the same time the high speed, magnetic clutch is energized, solenoids 16 are energized, automatically releasing latch 15 and allowing spring 12 to expand, imparting an initial kick or accelerating force to drum 1 by pawl 13. Because of the mechanical action required after the solenoid activation, the drum is not accelerated simultaneously with the clutch action. However, the accelerating force is designed to impart sufficient acceleration to the drum so that the lag between the drum and the armature 7 (and ring 10) is eliminated before coupling spring 11 is stretched far enough to allow pin 17 to reach the near end B of notch 18. Spring 12 should be limited in strength to prevent overdriving pin 17 during the kicking action. If pin 17 is overdriven, it will strike its seating position (end B) too hard and cause clutch slippage in a reverse direction.

After pawl 13 has applied an accelerating force to drum 1, it extends under and to the left of 14 until the recording cycle is completed. The accelerator is reset by reversing the direction of drum rotation causing 14 to temporarily depress and move by 15 and compress spring 12 until the drum stops. In the meantime, the latch 15 under the tension of 19 rises and blocks the movement of 14. The system is reset for the next recording cycle. In this manner pawl 13 of the drum accelerator means is made to intermittently contact the drum.

Figure 2:
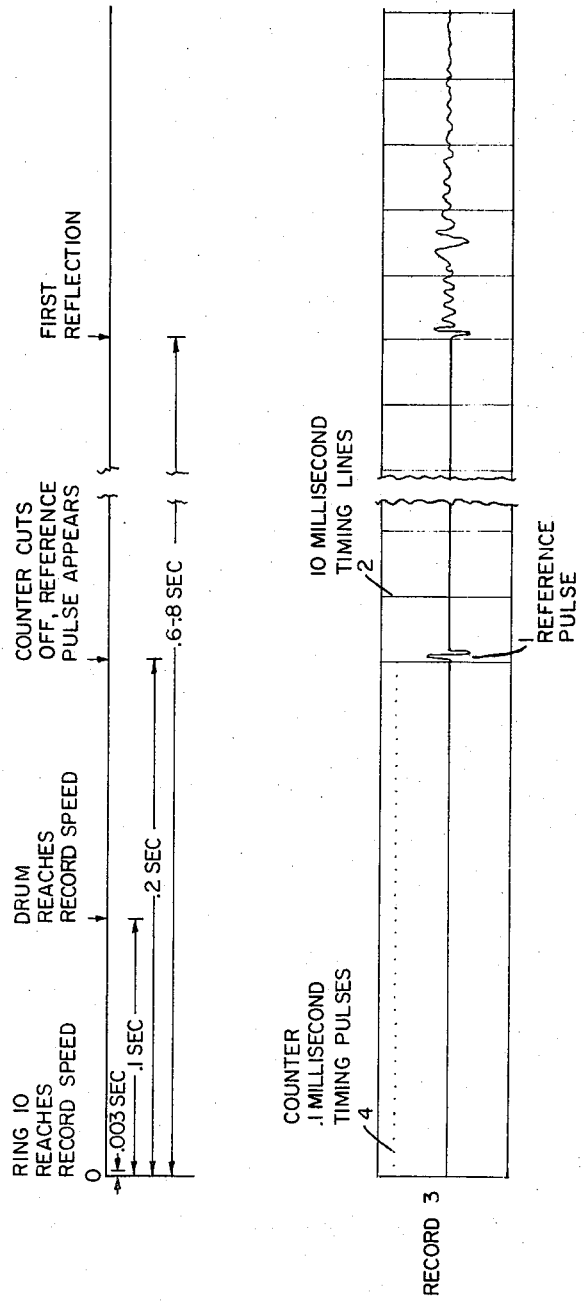
FIGURE 2 shows the operational sequence and a sample record plotted on a time base.

With the operation of applicants' invention in mind, reference is now made to FIGURE 2. This figure shows the operational sequence of driving the drum to record speed versus time. To better explain one use of applicants' novel invention, a schematic of a seismic record is shown under the sequence time plot. Since the time base is not drawn to scale, individual time increments are indicated by appropriate arrows. A maximum time for establishing positive contact with ring 10 (time required for ring 10 to reach synchronous speed) is 10 milliseconds, but a more probable time is 3 milliseconds, as illustrated. As shown in FIGURE 2, the operation is as follows: (a) at time 0, a weight strikes the ground, activating the clutch (and a counter, if used); (b) at time 0 plus approximately .003 second, ring 10 (shown in FIGURE 1) reaches recording speed (a counter, if used, is recording timing pulses 4, say, every .1 millisecond); (c) at time 0 plus about .1 second, recording drum 1 (shown in FIGURE 1) reaches recording speed (the time required for the drum to reach constant speed is the minimum appearance time for reference pulse 1 and the minimum cutoff time for the counter, if used); (d) at time 0 plus about .2 second (or the desired cutoff time), a counter, if used, cuts off and the reference pulse 1 is recorded; (e) at time 0 plus about .6 to .8 second, the first seismic reflection is recorded.

Clutch slippage, if any, is experienced during the period time 0 seconds to about .003 second. The period between the reference point 1 (at, say, .2 second) and the seismic or other type signal received can be accurately determined by conventional timing lines 2. Therefore, to add records, rerecordings are started from the reference pulse 1.

If desired, an electronic counter, or other type device, can be used to monitor the ring engagement time. This is used primarily to determine if there is a change in the ring engagement time due to machine wear over a long period of time or extreme changes in operating conditions. If such a change did appear, the counter time would be used instead of .2 second or the total elapsed time from 0 time to the appearance of the reference pulse.

In summary, to accomplish the objectives set forth supra, a method and apparatus have been devised by applicants to overcome or at least minimize to a satisfactory degree clutch slippage so that the amount of time in bringing the drum to recording speed is always uniform in amount or within the limits which can be tolerated in the system. In the geophysical art this starting time variation should not exceed 1 millisecond, because the desired record timing accuracy is at least 1 millisecond. Since a practical system cannot be devised in which there is no slippage or where the slippage is always the same, applicants have solved the slippage problem by reducing to a minimum slippage causes and the amount of time over which the remaining slippage occurs. In other words, a slippage of, say, 4 percent in a clutch system where the slippage lasts for, say, 50 milliseconds may create an objectionable drum lag. However, a slippage of, say, 4 percent over a period of 10 milliseconds may not be objectionable. Applicants overcame the slippage problem in the following manner:

(A) Reduce clutch slippage to a minimum. This is accomplished by:
  (1) Reducing initial engaging inertial shock on the clutch by locking a high mass rotating body to a low mass stationary body.
  (2) Overcoming friction inherent in the system by compliantly coupling the low mass body to a recording drum.
  (3) Reducing drum inertial shock on the clutch by independently accelerating the drum.

(B) Reduce time required to engage clutch to a minimum. This is accomplished by:
  (1) Utilizing a fast acting engaging or clutch means to lock the moving body with the stationary body.

Put in another way, a fast-acting clutch locks the revolving portion to a low mass body in a minimum of time; and the inertial and inherent frictional effects of the machine are reduced by a compliant coupling and an accelerator which insures that the recording drum reaches the synchronous speed of the clutch before sufficient force is exerted on the low mass body through the compliant coupling to cause clutch slippage.

From the foregoing it will be observed that applicants have devised a novel method and means for insuring a minimum uniform time delay in starting a recording drum. It is clear that the invention can be used with a conventional seismic recording system and that it enables such a system to record signals created by the weight drop technique or to simplify the addition of conventionally created signals. While only one particular apparatus has been illustrated and described, it will be apparent that further modifications will suggest themselves to those skilled in the art by the method described; and it is intended to cover such modifications as fall within the scope of the appended claims.

We claim:

1. In a recording system of the class wherein recording operations are commenced as a drum is accelerated from a stationary position, the improvement comprising in combination,
   (a) a rotatable recording drum means,
   (b) a high speed clutch means,
   (c) a compliant coupling means connecting said high speed clutch means to said drum means,
   (d) a drum accelerator means adapted to act independently of said clutch means and to contact and accelerate said drum means, and
   (e) a switching means connecting said clutch means to said drum accelerator means.

2. In a recording system as set forth in claim 1 wherein the high speed clutch means is a magnetic clutch and the drum accelerator means is a spring actuated pawl.

3. In a recording system as set forth in claim 1 wherein the high speed clutch means includes a rotating magnetic housing, a coil assembly, and a light weight armature supporting said coil assembly having a clutch surface, said coil assembly movably mounted within and connected to rotate with said magnetic housing.

4. In a recording system as set forth in claim 1 wherein the compliant coupling means includes a spring, said coupling means being adapted to urge the recording drum means in a fixed relation with the high speed clutch means after said drum means is accelerated to full speed.

5. In a recording system as set forth in claim 1 wherein the high speed clutch-accelerator means is actuated automatically.

6. In a recording system as set forth in claim 1 wherein the drum means includes a means for limiting the movement of the compliant coupling means connecting the clutch means to said drum means.

7. An improved high speed magnetic clutch for a recording drum comprising
   (a) a rotatable magnetic housing containing an indentation on one side thereof,
   (b) a lightweight armature slidably connected to rotate with said magnetic housing,
   (c) electrical windings mounted on a portion of said armature, said electrical windings positioned within said indentation, and
   (d) a ring member rotatably connected to said magnetic housing and located adjacent one side of said armature.

8. In a device as set forth in claim 7 wherein a recording drum means is connected to the ring member by a compliant coupling.

9. In a recording system of the class wherein recording operations are commenced as a drum is accelerated from a stationary position, the improvement comprising in combination
   (a) a recording drum connected by a compliant coupling to a clutch ring composed of nonmagnetic material and having a first clutch surface,
   (b) a rotatable high mass magnet,
   (c) an armature slidably mounted adjacent and connected to rotate with said magnet and having a mass substantially less than the mass of said magnet, said armature having a second clutch surface composed of nonmagnetic material and being adapted to engage said first clutch surface on said clutch ring, said armature adapted to create a magnetic field opposing the magnetic field of said magnet so that electric current passing through said armature causes said second clutch surface to engage said first clutch surface,
   (d) said clutch ring having a mass less than said armature, and
   (e) a drum accelerator means adapted to act independently of said clutch surfaces and to contact and accelerate said drum means before said compliant coupling controls the speed of rotation of said recording drum.

10. In a recording system as set forth in claim 9 wherein the drum accelerator means is electrically actuated and there is an electrical switching means connecting said armature and said drum accelerator so that both are actuated simultaneously.

References Cited by the Examiner

UNITED STATES PATENTS 1,072,913  9/1913  Collier _____ 192—84
2,479,986  8/1949  Thomas.

DAVID J. WILLIAMOWSKY, *Primary Examiner.*